(12) United States Patent
Choi et al.

(10) Patent No.: US 8,644,835 B2
(45) Date of Patent: Feb. 4, 2014

(54) COMMUNICATION METHOD OF MOBILE TERMINAL, PICO BASE STATION, AND MACRO BASE STATION IN HETEROGENEOUS NETWORK

(75) Inventors: Hyun Ho Choi, Suwon-si (KR); Dong Ho Cho, Seoul (KR); Jung Min Moon, Seoul (KR); Yong Jin Kwon, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 270 days.

(21) Appl. No.: 13/102,021

(22) Filed: May 5, 2011

(65) Prior Publication Data

US 2011/0306347 A1 Dec. 15, 2011

(30) Foreign Application Priority Data

Jun. 9, 2010 (KR) ........................ 10-2010-0054219

(51) Int. Cl.
*H04W 36/00* (2009.01)
*H04W 40/00* (2009.01)

(52) U.S. Cl.
USPC ........... 455/444; 455/436; 455/438; 455/443; 455/449

(58) Field of Classification Search
USPC .......................................... 455/436–444, 449
See application file for complete search history.

(56) References Cited

U.S. PATENT DOCUMENTS

| 7,839,827 | B2 * | 11/2010 | Kwun et al. | 370/332 |
| 8,260,299 | B2 * | 9/2012 | Yokota | 455/436 |
| 8,301,146 | B2 * | 10/2012 | Iwamura et al. | 455/437 |
| 8,331,940 | B2 * | 12/2012 | Kim et al. | 455/436 |
| 2005/0013276 | A1 * | 1/2005 | Ekl et al. | 370/332 |
| 2008/0009292 | A1 | 1/2008 | Julian et al. | |
| 2009/0028112 | A1 | 1/2009 | Attar et al. | |
| 2009/0137251 | A1 | 5/2009 | Ji et al. | |
| 2009/0190500 | A1 | 7/2009 | Ji et al. | |
| 2009/0305705 | A1 | 12/2009 | Black | |
| 2010/0144355 | A1 * | 6/2010 | Jin et al. | 455/444 |
| 2011/0086641 | A1 * | 4/2011 | Guvenc et al. | 455/437 |

FOREIGN PATENT DOCUMENTS

KR 10-2007-0000307 A 1/2007
KR 10-2009-0106731 A 10/2009

* cited by examiner

*Primary Examiner* — Nathan Mitchell
(74) *Attorney, Agent, or Firm* — NSIP Law

(57) ABSTRACT

A communication method of a macro base station serving a target mobile terminal in a macrocell including a picocell includes receiving information about an uplink interference of a pico base station in the picocell from the pico base station, and determining whether to perform a handover of the target mobile terminal to the pico base station based on an uplink interference of the macro base station and an uplink interference of the pico base station.

19 Claims, 10 Drawing Sheets

→ Interference

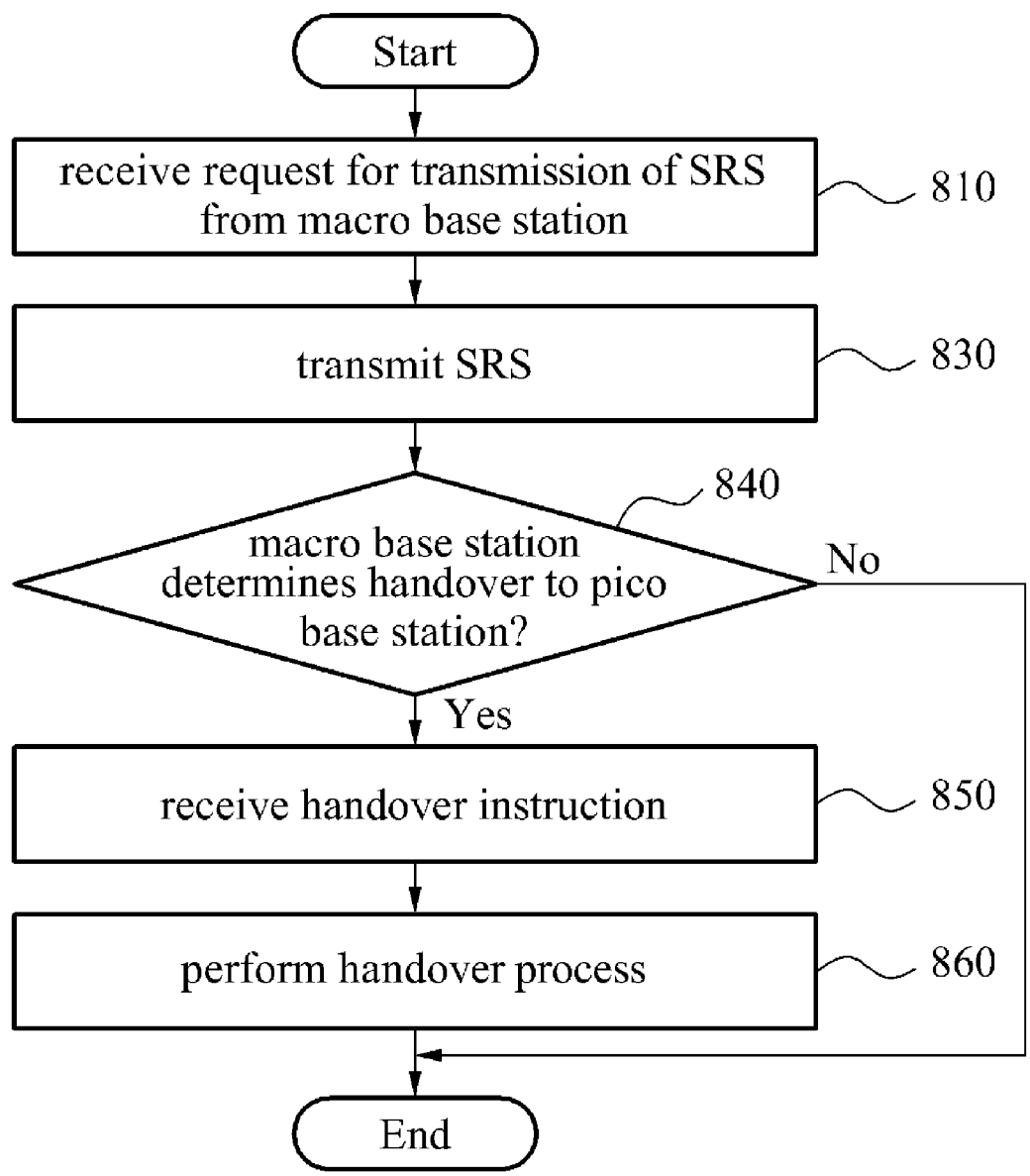

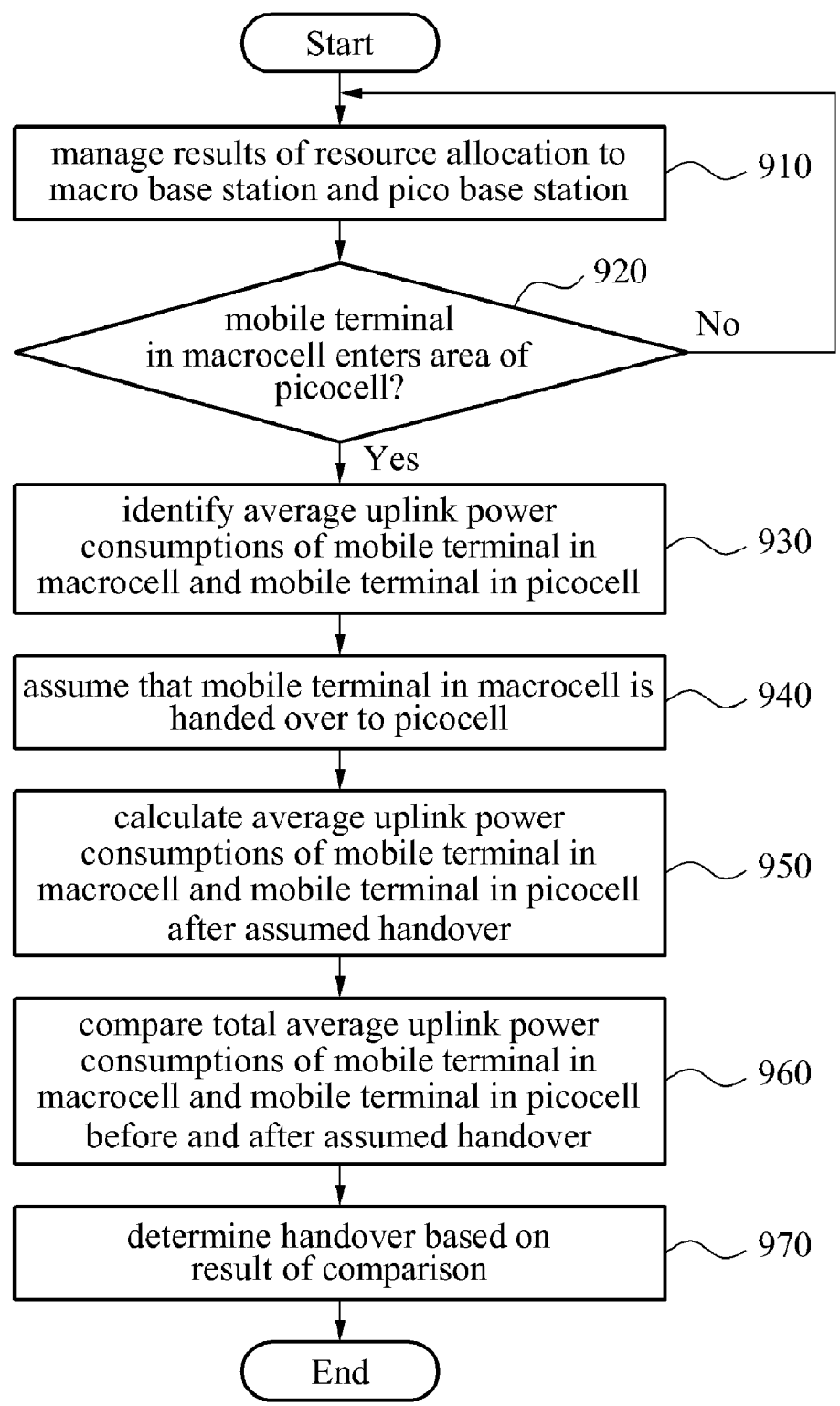

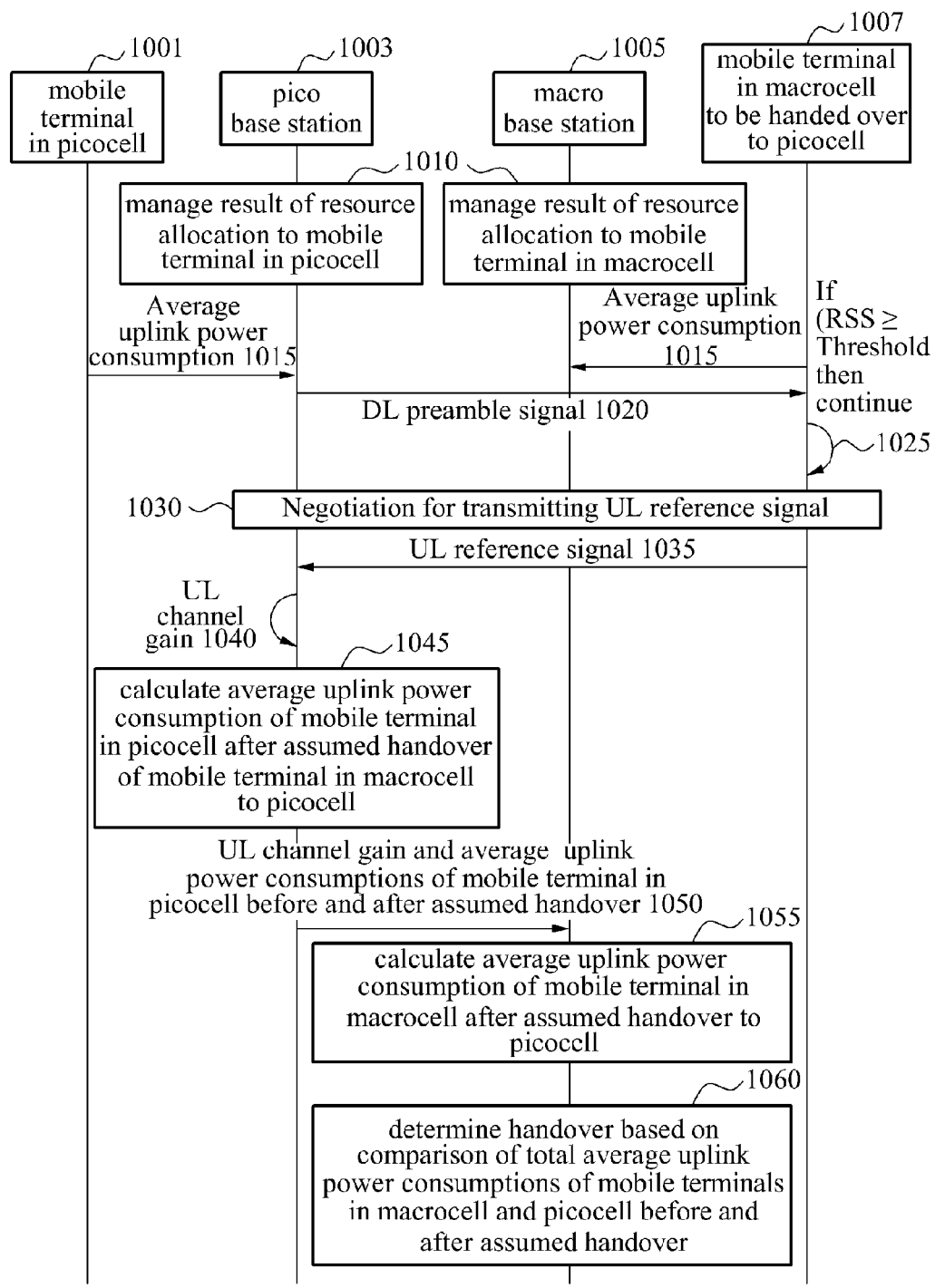

COMMUNICATION METHOD OF MOBILE TERMINAL, PICO BASE STATION, AND MACRO BASE STATION IN HETEROGENEOUS NETWORK

CROSS-REFERENCE TO RELATED APPLICATION

This application claims the benefit under 35 U.S.C. §119 (a) of Korean Patent Application No. 10-2010-0054219 filed on Jun. 9, 2010, in the Korean Intellectual Property Office, the entire disclosure of which is incorporated herein by reference for all purposes.

BACKGROUND

1. Field

The following description relates to a communication method of a mobile terminal, a pico base station, and a macro base station in a heterogeneous network.

2. Description of Related Art

When a mobile terminal in a heterogeneous network is located within cell coverage of a plurality of base stations, it is important to determine which of the base stations can efficiently serve the mobile terminal, and the determination is typically made based on two criteria.

Ideally, the mobile terminal selects a base station that transmits the strongest signal, and that also has the least path loss between the mobile terminal and the base station.

Generally, in a communication system having a regular arrangement of hexagonal cells, each base station transmits a preamble signal with the same transmission power. However, in a heterogeneous network communication system including a base station of a macrocell providing a communication service for a wide area, a base station of a picocell providing a communication service for a hotspot area, and a base station of a femtocell providing a communication service for an office or a residence, each base station transmits a preamble signal with an appropriate transmission power for each type of cell. For example, the transmission power of the preamble signal transmitted by the base station of the macrocell may be higher than the transmission power of the preamble signal transmitted by the base station of the picocell, which in turn may be higher than the transmission power of the preamble signal transmitted by the base station of the femtocell.

When a cell is selected by comparing strengths of signals with different transmission powers received by a mobile terminal, there is possibility that different cells may be selected by the mobile terminal depending on positional relations between base stations even though the environments between the mobile terminal and the base stations are the same.

SUMMARY

According to one general aspect, a communication method of a macro base station serving a target mobile terminal in a macrocell including a picocell includes receiving information about an uplink interference of a pico base station in the picocell from the pico base station, and determining whether to perform a handover of the target mobile terminal to the pico base station based on an uplink interference of the macro base station and an uplink interference of the pico base station.

The determining of whether to perform the handover may include calculating a signal-to-interference plus noise ratio (SINR) of the macro base station in an uplink, calculating an SINR of the pico base station in an uplink, and determining whether to perform the handover of the target mobile terminal to the pico base station based on the SINR of the macro base station and the SINR of the pico base station.

The determining of whether to perform the handover may include determining whether to perform the handover of the target mobile terminal to the pico base station by comparing a signal-to-interference plus noise ratio (SINR) of the macro base station with an SINR of the pico base station.

The determining of whether to perform the handover may include determining to perform the handover of the target mobile terminal to whichever one of the macro base station and the pico base station has a higher a signal-to-interference plus noise ratio (SINR).

The communication method may further include receiving, before receiving the information about the uplink interference of the pico base station, information about a first channel between the macro base station and the target mobile terminal, information about a second channel between the target mobile terminal and the pico base station, and information about the pico base station.

The communication method may further include transmitting a handover instruction to the target mobile terminal when a result of the determining is to perform the handover of the target mobile terminal to the pico base station.

According to another general aspect, a communication method of a pico base station in a macrocell includes receiving a request for information about an uplink interference of the pico base station from a macro base station serving a target mobile terminal in the macrocell, transmitting the information about the uplink interference of the pico base station to the macro base station, and performing a handover process to perform a handover of the target mobile terminal to the pico base station when the macro base station determines that the handover of the target mobile terminal to the pico base station is to be performed based on the information about the uplink interference of the pico base station.

The communication method may further include transmitting information about the pico base station to the target mobile terminal to enable the target mobile terminal to transmit the information about the pico base station to the macro base station.

According to another general aspect, a communication method of a macro base station serving a target mobile terminal in a macrocell including a picocell includes receiving, from a pico base station of the picocell, information about an effective uplink interference of the pico base station excluding an uplink interference from the target mobile terminal to the pico base station, and determining whether to perform a handover of the target mobile terminal to the pico base station based on an uplink interference of the macro base station and the effective uplink interference of the pico base station.

The communication method may further include receiving, from the pico base station, a request for the target mobile terminal to transmit a sounding reference signal, requesting the target mobile signal to transmit the sounding reference signal to the target mobile terminal and the pico base station to enable the macro base station to measure a first channel from the target mobile terminal to the macro base station, and the pico base station to measure a second channel from the target mobile terminal to the pico base station, The communication method may further include receiving, from the pico base station, information about the second channel from the target mobile terminal to the pico base station.

The communication method may further include sharing information about a wireless resource of the sounding reference signal and/or information about a pattern of the sounding reference signal with the pico base station.

The determining of whether to perform the handover may include calculating a signal-to-interference plus noise ratio (SINR) of the macro base station in an uplink based on the uplink interference of the macro base station, calculating an effective SINR of the pico base station in an uplink based on the effective uplink interference of the pico base station, determining whether to perform the handover of the target mobile terminal to the pico base station based on the SINR of the macro base station and the effective SINR of the pico base station.

In a further According to another general aspect, a communication method of a pico base station in a macrocell includes calculating an effective uplink interference of the pico base station excluding an uplink interference from a target mobile terminal in the macrocell to the pico base station, and transmitting, to a macro base station serving the target mobile terminal in the macrocell, information about the effective uplink interference of the pico base station, and information about a channel from the target mobile terminal to the pico base station.

The communication method may further include transmitting, to the macro base station, a request for the target mobile terminal to transmit a sounding reference signal, and measuring the channel from the target mobile terminal to the pico base station using the sounding reference signal.

The communication method may further include measuring the uplink interference from the target mobile terminal to the pico base station using the sounding reference signal.

According to another general aspect, a communication method of a target mobile terminal in a macrocell served by a macro base station and including a picocell includes receiving, from the macro base station, a request for the target mobile terminal to transmit a sounding reference signal, transmitting the sounding reference signal to the macro base station and a pico base station of the picocell, and receiving a handover instruction from the macro base station when the macro base station determines to perform a handover of the target mobile terminal to the pico base station based on an uplink interference of the macro base station and an effective uplink interference of the pico base station excluding an uplink interference from the target mobile terminal to the pico base station.

In the communication method, the transmitting of the sounding reference signal may include transmitting the sounding reference signal using information about a wireless resource of the sounding reference signal and/or information about a pattern of the sounding reference signal that is determined in advance.

The communication method may further include performing a handover process to perform the handover of the target mobile terminal to the pico base station in response to the receiving of the handover instruction.

According to another aspect, a communication method of a macro base station serving a mobile terminal in a macrocell comprising a picocell of a pico base station serving a mobile terminal in the picocell includes receiving, from the mobile terminal in the macrocell, an average uplink power consumption of the mobile terminal in the macrocell before an assumed handover of the mobile terminal in the macrocell to the picocell, receiving, from the pico base station, an uplink channel gain of an uplink channel between the mobile terminal in the macrocell and the pico base station, an average uplink power consumption of the mobile terminal in the picocell before the assumed handover of the mobile terminal in the macrocell to the picocell, and an average uplink power consumption of the mobile terminal in the picocell after the assumed handover of the mobile terminal in the macrocell to the picocell, calculating an average uplink power consumption of the mobile terminal in the macrocell after the assumed handover of the mobile terminal in the macrocell to the picocell based on the uplink channel gain of the uplink channel between the mobile terminal in the macrocell and the pico base station, comparing a sum of the average uplink power consumption of the mobile terminal in the macrocell and the average uplink power consumption of the mobile station in the picocell before the assumed handover of the mobile station in the macrocell to the picocell with a sum of the average uplink power consumption of the mobile terminal in the macrocell and the average uplink power consumption of the mobile station in the picocell after the assumed handover of the mobile station in the macrocell to the picocell, and determining whether to hand over the mobile terminal in the macrocell to the picocell based on a result of the comparing.

In the communication method, the determining may include determining to hand over the mobile terminal in the macrocell to the picocell if the sum of the average uplink power consumption of the mobile terminal in the macrocell and the average uplink power consumption of the mobile station in the picocell before the assumed handover of the mobile station in the macrocell to the picocell is greater than the sum of the average uplink power consumption of the mobile terminal in the macrocell and the average uplink power consumption of the mobile station in the picocell after the assumed handover of the mobile station in the macrocell to the picocell, and determining not to hand over the mobile terminal in the macrocell to the picocell if the sum of the average uplink power consumption of the mobile terminal in the macrocell and the average uplink power consumption of the mobile station in the picocell before the assumed handover of the mobile station in the macrocell to the picocell is less than the sum of the average uplink power consumption of the mobile terminal in the macrocell and the average uplink power consumption of the mobile station in the picocell after the assumed handover of the mobile station in the macrocell to the picocell.

As described above, according to various aspects, a target mobile terminal is handed over to a cell having a higher SINR based on information about an uplink interference of each of a plurality of base stations, thereby reducing an uplink power consumption of the target mobile terminal.

Further, according to various aspects, since the uplink power consumption of the target mobile terminal is reduced, an uplink interference induced in another cell by the target mobile terminal is decreased, thereby enhancing an overall uplink throughput.

Other features and aspects will be apparent from the following detailed description, the drawings, and the claims.

BRIEF DESCRIPTION OF THE DRAWINGS

FIG. 8 is a flowchart illustrating an example of a communication method of a mobile terminal.

FIG. 9 is a flowchart illustrating an example of a method of determining whether to perform a handover of a mobile terminal by comparing total average uplink power consumptions before and after an assumed handover of the mobile terminal.

FIG. 10 illustrates an example of an operation of a network to determine whether to perform a handover of a mobile terminal using the method shown in FIG. 9.

Throughout the drawings and the detailed description, unless otherwise described, the same drawing reference numerals refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The sequences of processing steps and/or operations described are examples; however, the sequences of processing steps and/or operations are not limited to the examples set forth herein and may be changed as is known in the art, with the exception of processing steps and/or operations necessarily occurring in a certain order. Also, description of well-known functions and constructions may be omitted for increased clarity and conciseness.

Figure 1:
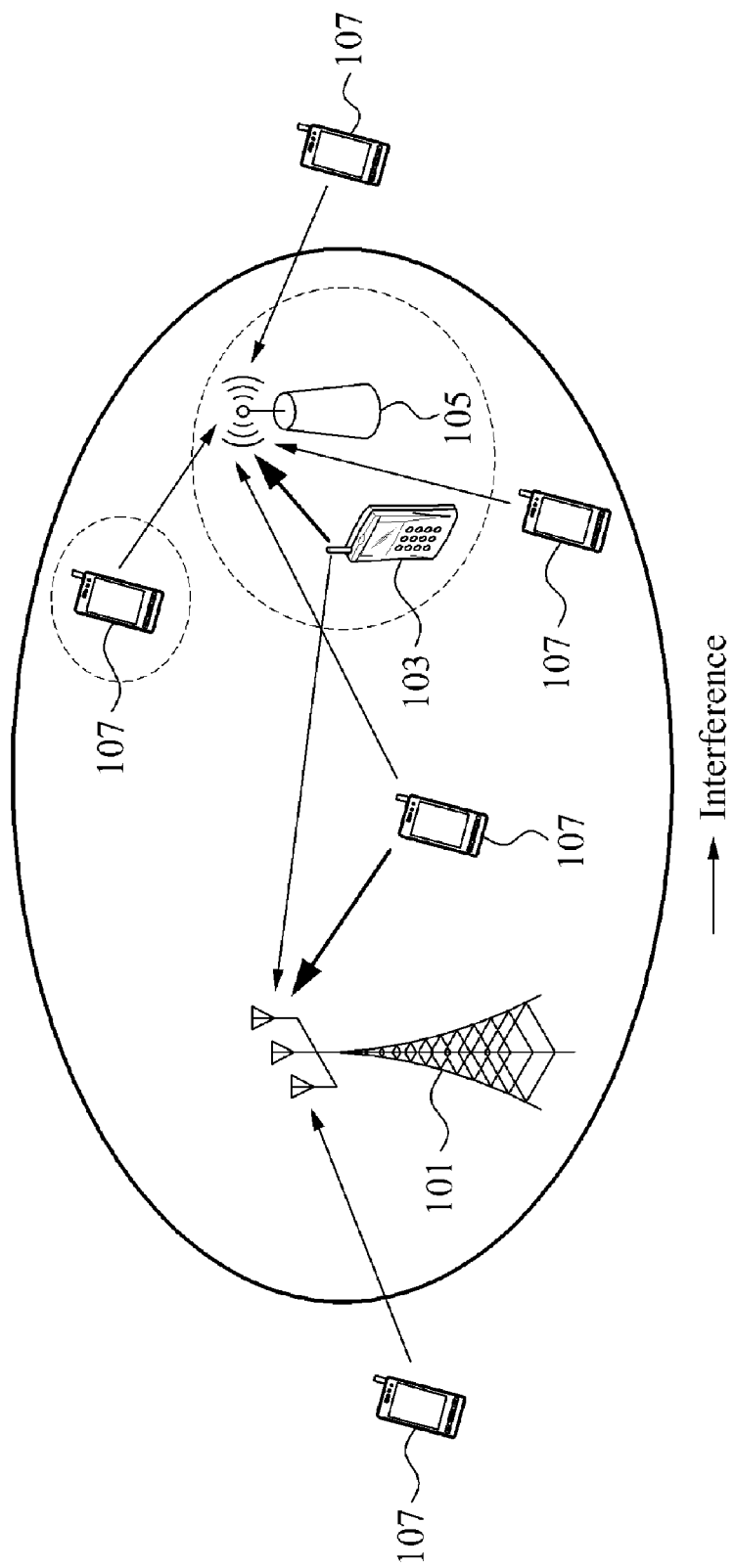
FIG. 1 illustrates an example of interference among a macro base station, a pico base station, and a target mobile terminal in a heterogeneous network for uplink traffic.

FIG. 1 illustrates an example of interference among a macro base station, a pico base station, and a target mobile terminal in a heterogeneous network for uplink traffic.

Referring to FIG. 1, the heterogeneous network includes a macro base station 101, a mobile terminal 103, a pico base station 105, and other mobile terminals 107.

The macro base station 101 supports a communication service for a macrocell, such as a wide geographical area. The pico base station 105 supports a communication service for a picocell, such as a hotspot. The macrocell may include a plurality of picocells and/or femtocells. However, a picocell or a femtocell may also be referred to as a microcell by some providers. Merely as an example, a macrocell may have a width of 1 km or more, a picocell may have a width of 200 m or less, and a femtocell may have a width of about 10 m. However, it is understood that other widths may be used.

The target mobile terminal 103 is a mobile terminal that is located in the macrocell served by the macro base station 101, and is currently being provided with a communication service from the macro base station 101 when it enters the picocell served by the pico base station 105. Thus, the target mobile terminal 103 becomes a target of a handover from the macro base station 101 to the pico base station 105.

The other mobile terminals 107 are provided with a communication service from the macro base station 101 or the pico base station 105.

As shown in FIG. 1, when the target mobile terminal 103 that is currently being provided with the communication service from the macro base station 101 enters the picocell of the pico base station 105, the target mobile terminal 103 is located in a communication service area of both the macrocell and the picocell.

Thus, the target mobile terminal 103 needs to determine whether it is more favorable for the target mobile terminal 103 to continue to be provided with a communication service from the macro base station 101, or to be provided with a communication service from the pico base station 105, to improve performance of the target mobile terminal 103 and/or an overall communication system.

For example, when the macro base station 101 and the pico base station 105 are located close to each other, the target mobile terminal 103 entering the picocell may receive a stronger signal from the macro base station 101 than from the pico base station 105 because a transmission power of the macro base station 101 is generally greater than a transmission power of the pico base station 105.

Thus, even though the target mobile terminal 103 is currently positioned in the picocell, the target mobile terminal 103 may still be provided with a service from the macro base station 101.

In contrast, when the pico base station 105 is located far away from the macro base station 101, the target mobile terminal 103 positioned in the picocell typically may be provided with a service from the pico base station 105.

As described above, in a mobile communication system in a heterogeneous network that includes a macrocell, a picocell, a femtocell, and the like, a transmission power of each base station may be set differently.

Thus, although environments between mobile terminals and respective base stations are the same, the mobile terminals may select a different base station of a different cell to provide a communication service based on a relative position between a macro base station and a pico base station.

Likewise, in FIG. 1, the target mobile terminal 103 may select either to continue to be provided with the service from the macrocell, or to perform a handover at its current location to the pico base station to be provided with a communication service from the picocell, depending on which is more favorable for the target mobile terminal 103.

Generally, the performance of a mobile terminal or a mobile communication system in a heterogeneous network may be improved based on two factors, i.e., an uplink power consumption of the mobile terminal, and an uplink throughput of the mobile terminal.

Since the mobile terminal operates with a limited amount of battery power, a user may be provided with a service for a longer period of time when the uplink power consumption of the mobile terminal is reduced. Further, when the uplink power consumption of the mobile terminal is reduced, an uplink interference in another mobile terminal is also reduced.

In a downlink of the heterogeneous network, interference elements measured in the respective mobile terminals 103 and 107 in the macrocell are the same. Thus, in a downlink, a determination of a cell for a handover based on a reference signal received power (RSRP) is the same as a determination of a cell for a handover based on a signal-to-interference plus noise ratio (SINR).

However, in an uplink of the heterogeneous network, interference elements measured in the macro base station 101 and the pico base station 105 are different, and the uplink interference is more substantial in the pico base station 105 than in the macro base station 101. Thus, when determining an uplink handover, the interference elements of both the macro base station 101 and the pico base station 105 in the macrocell are considered.

Figure 2:
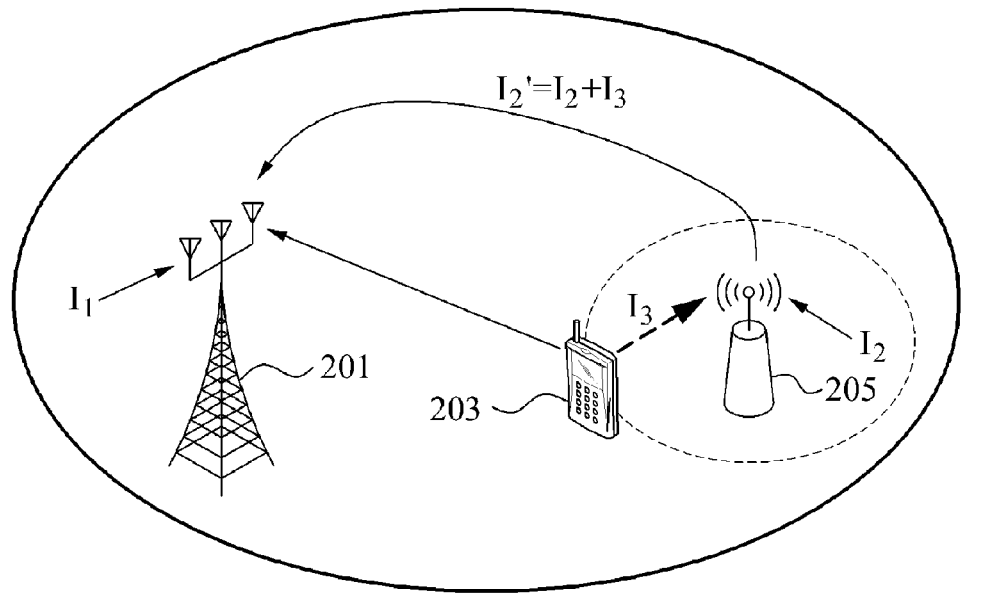
FIG. 2 illustrates an example of a configuration and an operation of a network to determine whether to perform a handover of a target mobile terminal based on interference of the target mobile terminal in another cell in a heterogeneous network for uplink traffic.

FIG. 2 illustrates an example of a configuration and an operation of a network to determine whether to perform a handover of a target mobile terminal based on interference of the target mobile terminal in another cell in a heterogeneous network for uplink traffic.

Referring to FIG. 2, the network to determine whether to perform the handover based on the interference of the target mobile terminal of the handover in the other cell in the heterogeneous network for uplink traffic includes a macro base station 201, a target mobile terminal 203, and a pico base station 205.

The macro base station 201 calculates an SINR of each of the macro base station 201 and the pico base station 205 based on an uplink interference received by each of the macro base station 201 and the pico base station 205, compares the SINRs with each other, and determines whether to perform a handover of the target mobile terminal 203 to another cell served by a base station having a higher SINR.

The uplink interference received by the macro base station 201 is $I_1$, and the uplink interference received by the pico base station 205 is $I_2'=I_2+I_3$.

That is, the interference received by the pico base station 205 before the target mobile terminal 203 is handed over from a macrocell to a picocell is a sum $I_2'$ of an interference $I_3$ induced by the target mobile terminal 203 and an interference $I_2$ induced by other adjacent nodes.

Operations in the macro base station 201, the target mobile terminal 203, and the pico base station 205 in the above network will now be described.

The target mobile terminal 203 receives information about the pico base station 205 (PBS information) from the pico base station (207). The information about the pico base station 205 may include identification (ID) information of the pico base station 205 to which the target mobile terminal 203 may be potentially connected (handed over). Also, the target mobile terminal 203 measures information $g_1$ about a first channel between the macro base station 201 and the target mobile terminal 203 in the macrocell (210). Also, the target mobile terminal 203 measures information $g_2$ about a second channel between the target mobile terminal 203 and the pico base station 205 of a picocell in the macrocell (220). Although FIG. 2 shows that the macrocell includes only one picocell served by the pico base station 205, the macrocell may include a plurality of picocells each served by a respective one of a plurality of pico base stations.

The target mobile terminal 203 may measure a state of each of the first channel and the second channel using the information $g_1$ about the first channel and the information $g_2$ about the second channel.

The information $g_1$ about the first channel and the information $g_2$ about the second channel may include a received signal strength (RSS) of each channel, or an SINR of each channel.

The target mobile terminal 203 transmits a handover request message including the information $g_1$ about the first channel, the information $g_2$ about the second channel, and the information about the pico base station 205 (the PBS information) to the macro base station 201 that is a base station of the macrocell serving the target mobile terminal 203 (230).

The macro base station 201 prepares for a handover of the target mobile terminal 203 when the macro base station 201 receives the handover request message from the target mobile terminal 203 (240).

The macro base station 201 identifies the ID information of the pico base station 205 to which the target mobile terminal 203 is to be handed over and requests information about uplink interference in a corresponding picocell from the pico base station 205, that is, information about a total uplink interference $I_2'$ (250).

The total uplink interference $I_2'$ in the picocell includes an interference $I_3$ induced by the target mobile terminal 203 that is a target of the handover and an interference $I_2$ induced by other terminals and/or other pico base stations adjacent to the picocell served by the pico base station 205.

Since the pico base station 205 does not identify the interference $I_3$ induced by the target mobile terminal 203 that is a target of the handover before the target mobile terminal 203 is handed over, the total uplink interference $I_2'$ in the picocell may be measured regardless of the interference sources. An uplink interference measured regardless of the interference sources is referred to as an implicit interference.

The pico base station 205 receiving the request for the information about the uplink interference $I_2'$ transmits the information about the currently measured uplink interference $I_2'$ in the pico base station 205 to the macro base station 201 (260).

The macro base station 201 determines whether to perform the handover of the target mobile terminal 203 to the pico base station 205 based on an uplink interference of the macro base station 201 and the uplink interference of the pico base station 205 (270).

In the operation 270, the macro base station 201 compares an $SINR_1$ of the macro base station 201 with an $SINR_2$ of the pico base station 205 in an uplink measured by itself from the target mobile terminal 203.

The $SINR_2$ of the pico base station 205 may be calculated using the information about the uplink interference $I_2'$ of the pico base station 205 received by the macro base station 201 from the pico base station 205.

The macro base station 201 determines whether to perform the handover of the target mobile terminal 203 to whichever one of the macro base station 201 and the pico base station 205 has a higher SINR.

The macro base station 201 transmits a handover instruction to the target mobile terminal 203 when it determines that the handover of the target mobile terminal 203 to the pico base station 205 is to be performed (280).

Figure 3:
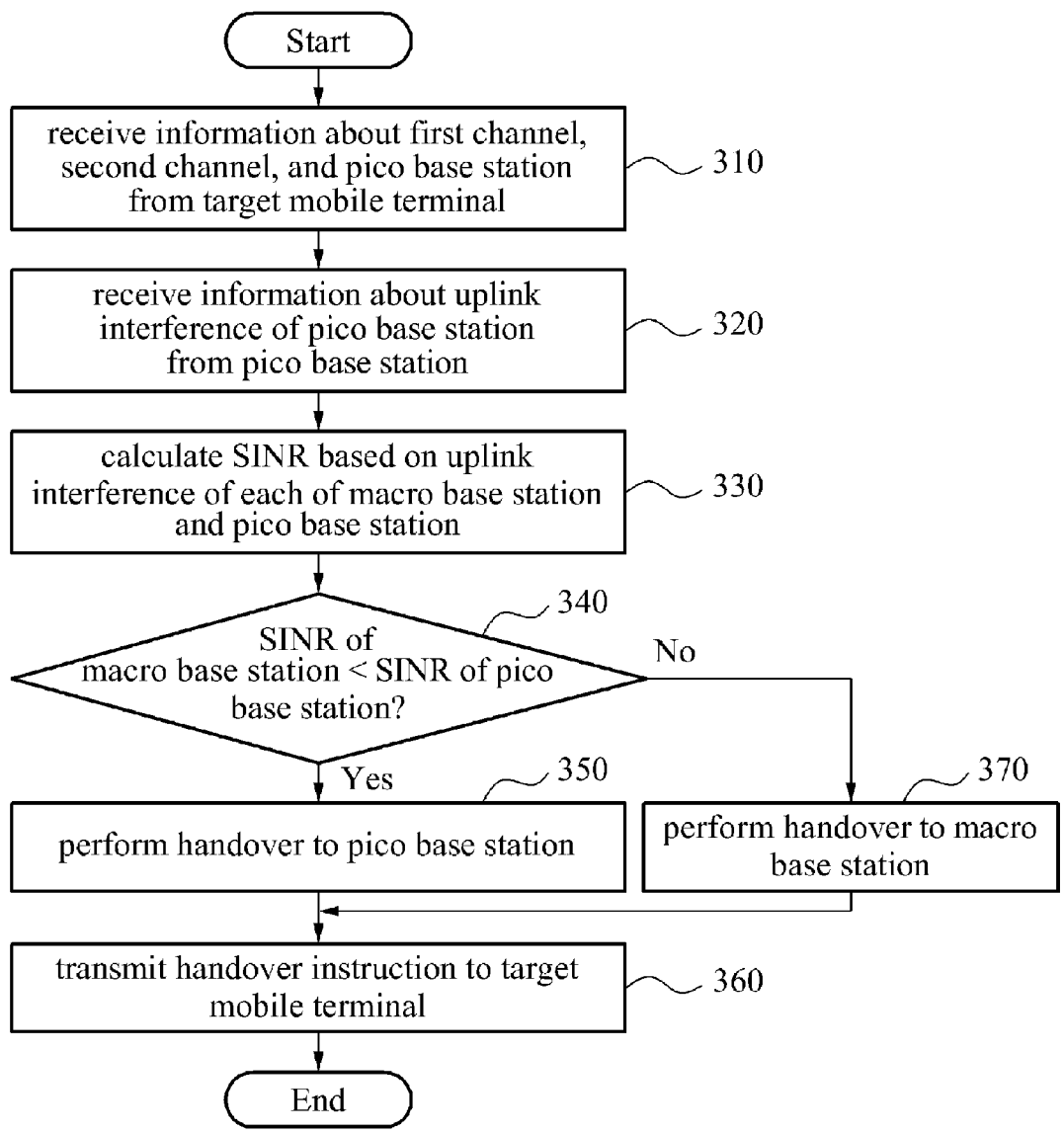
FIG. 3 is a flowchart illustrating an example of a communication method of a macro base station.

FIG. 3 is a flowchart illustrating an example of a communication method of a macro base station.

Referring to FIG. 3, the macro base station serving a target mobile terminal in a macrocell receives, from the target mobile terminal, information about a first channel between the macro base station and the target mobile terminal in the macrocell, information about a second channel between the target mobile terminal and a pico base station of a picocell in the macrocell, and information about the at least one pico base station (310).

The information about the first channel may include an RSS or an SINR between the macro base station and the target mobile terminal in the macrocell.

The information about the second channel may include an RSS or an SINR between the target mobile terminal and the pico base station of the picocell in the macrocell.

The information about the pico base station may include ID information of a pico base station to which the target mobile terminal is to be handed over.

The information about the first channel, the information about the second channel, and the information about the pico base station may be included, for example, in a handover request message transmitted from the target mobile terminal to the macro base station. The handover request message is a message requesting a handover of the target mobile terminal from the macro base station to a pico base station in the same macrocell.

The macro base station receives information about an uplink interference of the pico base station from the pico base station of the picocell in the macrocell (320).

The macro base station calculates an $SINR_1$ of the macro base station in an uplink and an $SINR_2$ of the pico base station in an uplink to be used in determining whether to perform the handover of the target mobile terminal to the pico base station (330).

The $SINR_1$ of the macro base station may be expressed by the following Equation 1, and the $SINR_2$ of the pico base station may be expressed by the following Equation 2:

$$SINR_1 = \frac{g_1 P}{I_1 + N} \quad (1)$$

$$SINR_2 = \frac{g_2 P}{I_2' + N} \quad (2)$$

In Equations 1 and 2, $g_1$ is a channel gain that is the information about the first channel, $g_2$ is a channel gain that is the information about the second channel, P is a transmission power of the target mobile terminal, N is a noise, $I_1$ is an interference in the macro base station, and $I_2'$ is an interference in the pico base station.

The macro base station determines whether to perform the handover to a base station having a higher SINR by comparing the $SINR_1$ of the macro base station with the $SINR_2$ of the pico base station.

In detail, the macro base station determines whether the $SINR_2$ of the pico base station is greater than the $SINR_1$ of the macro base station by a predetermined value or more (340). The predetermined value may be 0 or any suitable positive value. Operation 340 in FIG. 3 shows an example in which the predetermined value is 0.

The macro base station determines to perform the handover to the pico base station when the $SINR_2$ of the pico base station is greater than the $SINR_1$ of the macro base station (350).

The macro base station transmits a handover instruction to the target mobile terminal when the macro base station determines that the handover of the target mobile terminal to the pico base station is to be performed (360).

In the operation 340, when the $SINR_1$ of the macro base station is greater than the $SINR_2$ of the pico base station, the target mobile terminal is handed over to the macro base station. That is, the target mobile terminal is not disconnected from the macro base station that is currently providing the target mobile terminal with a communication service, but continues to be provided with the communication service from the same macro base station.

Figure 4:
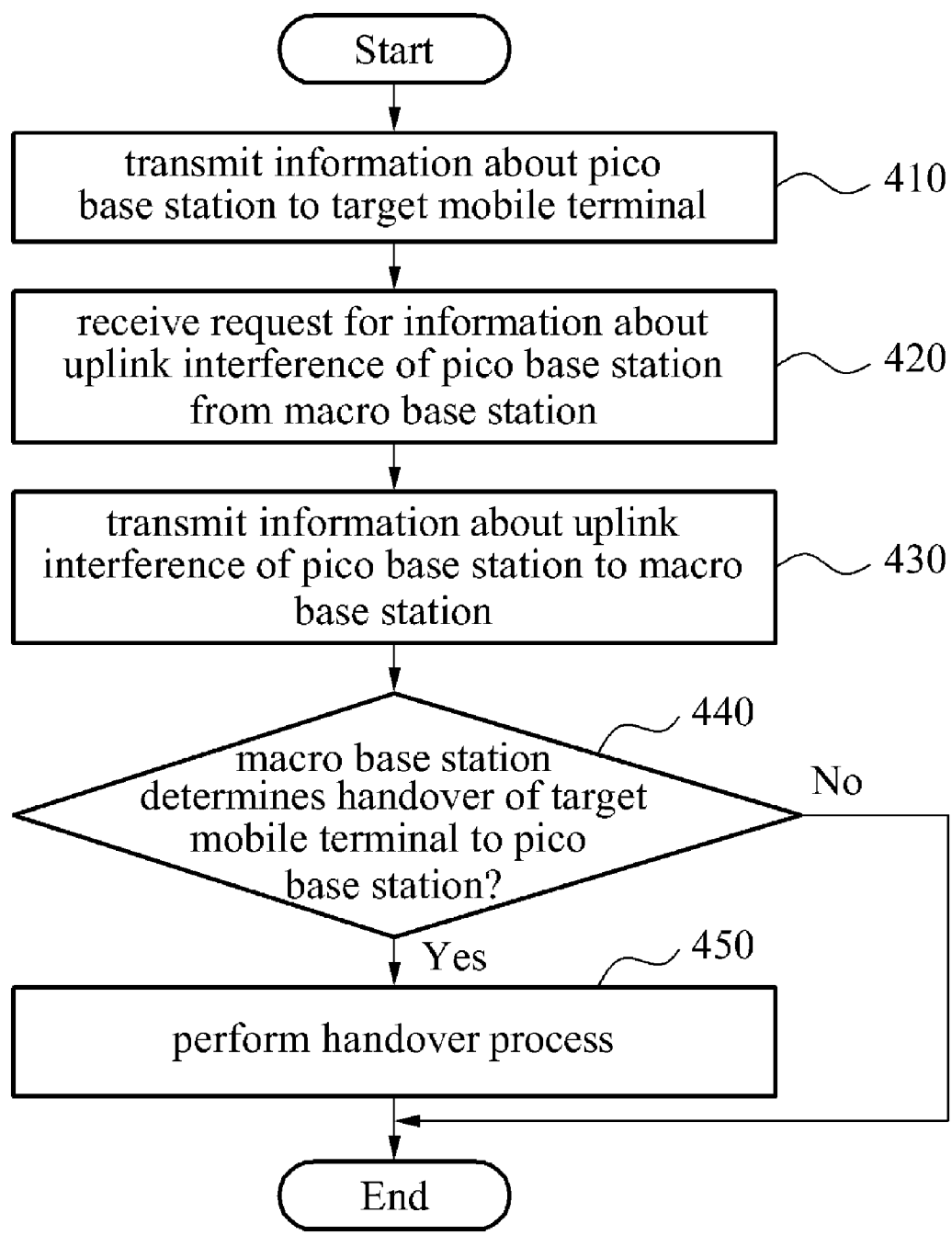
FIG. 4 is a flowchart illustrating an example of a communication method of a pico base station.

FIG. 4 is a flowchart illustrating an example of a communication method of a pico base station.

Referring to FIG. 4, a pico base station in a macrocell transmits information about the pico base station to the target mobile terminal so the target mobile terminal can transmit this information to a macro base station in the macrocell that is currently serving the target mobile terminal (410).

The information about the pico base station was described above in the description of FIGS. 2 and 3.

The pico base station receives a request for information about an uplink interference of the pico base station from the macro base station serving the target mobile terminal in the macrocell (420).

The pico base station transmits the information about the uplink interference of the pico base station to the macro base station (430).

The pico base station determines whether the macro base station has determined to perform a handover of the target mobile terminal to the pico base station based on the information about the uplink interference of the pico base station (440).

In the operation 440, when the macro base station has determined to perform a handover of the target mobile terminal to the pico base station, the pico base station performs a handover process to hand over the target mobile terminal to the pico base station (450).

Figure 5:
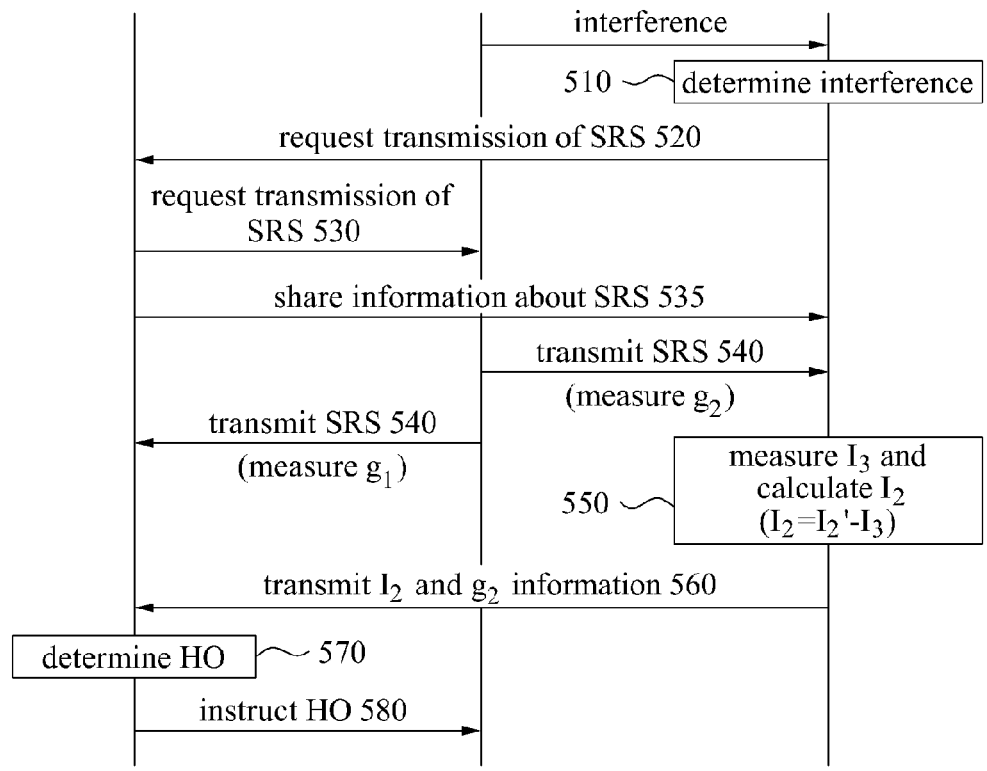
FIG. 5 illustrates an example of a configuration and an operation of a network to determine whether to perform a handover of a target mobile terminal based on an uplink interference in a macro base station and a pico base station in a heterogeneous network for uplink traffic.

FIG. 5 illustrates an example of a configuration and an operation of a network to determine whether to perform a handover of a target mobile terminal based on an uplink interference in a macro base station and a pico base station in a heterogeneous network for uplink traffic.

Referring to FIG. 5, a network to determine whether to perform the handover based on the uplink interference in the macro base station and the pico base station in the heterogeneous network for uplink traffic includes a macro base station 501 of a macrocell, a target mobile terminal 503, and a pico base station 505 of a picocell in the macrocell.

The macro base station 501 calculates an SINR of each of the macro base station 501 and the pico base station 505 based on an uplink interference received by each of the macro base station 501 and the pico base station 505, compares the SINRs with each other, and determines to perform a handover of the target mobile terminal 503 to whichever one of the macro base station 501 and the pico base station 505 has a higher SINR.

The macro base station 501 considers information about an effective uplink interference of the pico base station 505 excluding an uplink interference from the target mobile terminal 503 to the pico base station 505.

That is, the macro base station 501 uses only the effective uplink interference $I_2 = I_2' - I_3$ of the pico base station 505 excluding the uplink interference $I_3$ from the target mobile terminal 503 to the pico base station 505, which will disappear after the target mobile terminal 503 is handed over to the pico base station 505.

Therefore, an SINR of the pico base station 505 obtained when the target mobile terminal 503 is handed over to the pico base station 505 excludes the interference $I_3$ induced by the target mobile terminal 503 in the pico base station 505.

Thus, the handover of the target mobile terminal 503 is determined by calculating an SINR of the pico base station 505 using only a remaining interference $I_2 = I_2' - I_3$ excluding the interference $I_3$ induced by the target mobile terminal 503 in the pico base station 505 before the handover.

Operations in the macro base station 501, the target mobile terminal 503, and the pico base station 505 in the network will now be described.

When the pico base station determines that interference is being induced by the target mobile terminal 503 in the pico base station (510), the pico base station 505 requests the macro base station 501 to request that all mobile terminals in the macrocell served by the macro base station 501 transmit an uplink sounding reference signal (SRS) (520).

The macro base station 501 receives the request and broadcasts the request for the transmission of the uplink SRS to all mobile terminals in the macrocell (530).

The macro base station 501 allocates a transmission resource of the uplink SRS to the mobile terminals in the macrocell including the target mobile terminal 503 to enable the mobile terminals to transmit the SRS.

Further, the macro base station 501 shares information about a wireless resource of the SRS and/or information about a pattern of the SRS with the pico base station 505 (535).

The target mobile terminal 503 receives the request for the transmission of the uplink SRS from the macro base station 501 and transmits the SRS to the macro base station 501 and the pico base station 505 (540).

The target mobile terminal 503 transmits the SRS using the information about the wireless resource of the SRS and/or the information about the pattern of the SRS, which is determined in advance based on an ID of the target mobile terminal 503 in the transmission resource of the uplink SRS allocated by the macro base station 501.

The macro base station 501 measures information g1 about a first channel from the target mobile terminal 503 to the macro base station 501 using the SRS transmitted by the target mobile terminal 503 (540), and the pico base station 505 measures information g2 about a second channel from the target mobile terminal 503 to the pico base station 505 using the SRS transmitted by the target mobile terminal 503 (540). The macro base station 501 already knows the wireless resource of the SRS and/or the pattern of the SRS because the macro base station 501 allocated a transmission resource of the uplink SRS to the target mobile terminal 503, and shared information about the SRS with the pico base station in the operation 535. The pico base station 505 identifies the wireless resource of the SRS and/or the pattern of the SRS from the information about the SRS shared by the macro base station 501 in the operation 535.

The pico base station 505 measures the interference $I_3$ induced by the target mobile terminal 503 in the pico base station 505 using the SRS transmitted by the target mobile terminal 503 (550).

The pico base station 505 calculates an effective uplink interference $I_2 = I_2' - I_3$ of the pico base station 505 excluding the uplink interference $I_3$ induced by the target mobile terminal 503 in the pico base station 505 (550).

The pico base station 505 transmits, to the macro base station 501, the effective uplink interference $I_2$ of the pico base station 505 and the information g2 about the second channel from the target mobile terminal 503 to the pico base station 505 (560).

The pico base station 505 may calculate an effective $SINR_2$ of the pico base station 505 in an uplink based on the effective uplink interference $I_2$ of the pico base station 505 and the information g2 about the second channel in the operation 550, and transmit only the effective $SINR_2$ of the pico base station 505 to the macro base station 501 in the operation 560.

The macro base station 501 calculates an $SINR_1$ of the macro base station 501 in an uplink and an effective $SINR_2$ of the pico base station 505 in an uplink and determines whether to perform a handover of the target mobile terminal 503 to the pico base station 505 (570).

The macro base station 501 determines to perform the handover to whichever one of the macro base station 501 and the pico base station 505 has a higher SINR by comparing the $SINR_1$ of the macro base station 501 in an uplink with the effective $SINR_2$ of the pico base station 505 in an uplink.

The macro base station 501 transmits a handover instruction to the target mobile terminal 503 when a base station for the handover has been determined (580).

Figure 6:
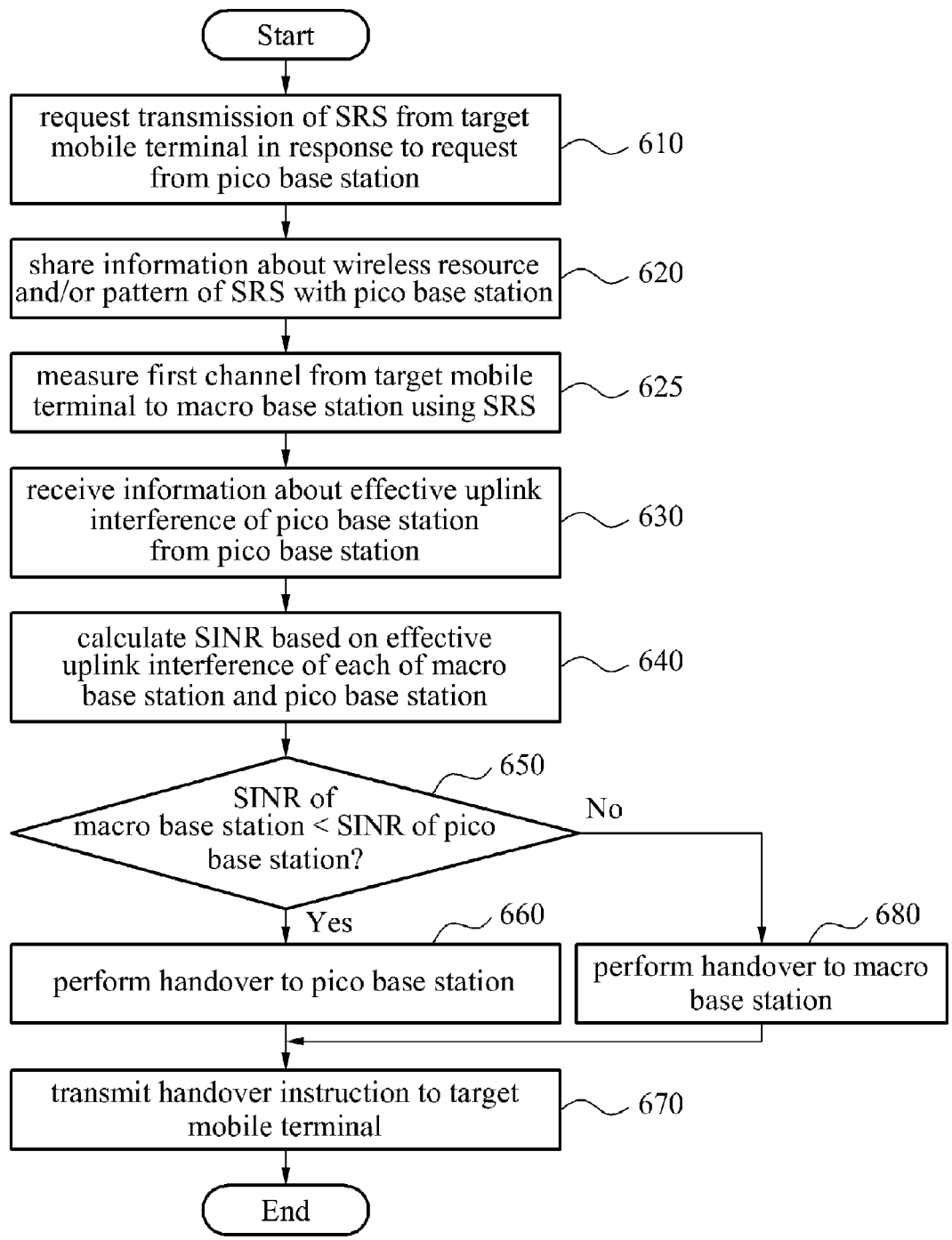
FIG. 6 is a flowchart illustrating an example of a communication method of a macro base station.

FIG. 6 is a flowchart illustrating an example of a communication method of a macro base station.

Referring to FIG. 6, the macro base station requests transmission of an SRS from a target mobile terminal in response to a request received from a pico base station in the macrocell (610). The macro base station requests the transmission of the SRS from the target mobile terminal to enable the macro base station to measure a first channel from the target mobile terminal to the macro base station, and the pico base station to measure a second channel from the target mobile terminal to the pico base station.

The macro base station shares information about a wireless resource of the SRS and/or information about a pattern of the SRS with the pico base station (620).

The macro base station measures the first channel from the target mobile terminal to the macro base station using the SRS transmitted by the target mobile terminal (625).

The macro base station receives, from the pico base station, information about an effective uplink interference of the pico base station excluding an uplink interference from the target mobile terminal to the pico base station (630).

The macro base station calculates an SINR of the macro base station in an uplink and an effective SINR of the pico base station in an uplink based on an uplink interference of the macro base station and the effective uplink interference of the pico base station in order to determine whether to perform a handover of the target mobile terminal to the pico base station (640).

The macro base station determines whether to perform the handover of the target mobile terminal to the pico base station based on the uplink interference of the macro base station and the effective uplink interference of the pico base station.

Specifically, the macro base station determines whether the effective SINR of the pico base station in an uplink is greater than the SINR of the macro base station in an uplink (650).

If the effective SINR of the pico base station is greater than the SINR of the macro base station in the operation 650, the macro base station determines to perform a handover to the pico base station (660), and transmits a handover instruction to the target mobile terminal (670), which will cause the target mobile terminal to perform a handover of the mobile terminal to the pico base station.

If the SINR of the macro base station is greater than the effective SINR of the pico base station in the operation 650, the macro base station determines to perform the handover to the macro base station (680), and transmits a handover instruction to the target mobile terminal (670), which will cause the target mobile terminal to maintain the existing connection to the macro base station instead of performing a handover of the target mobile terminal to the pico base station.

Figure 7:
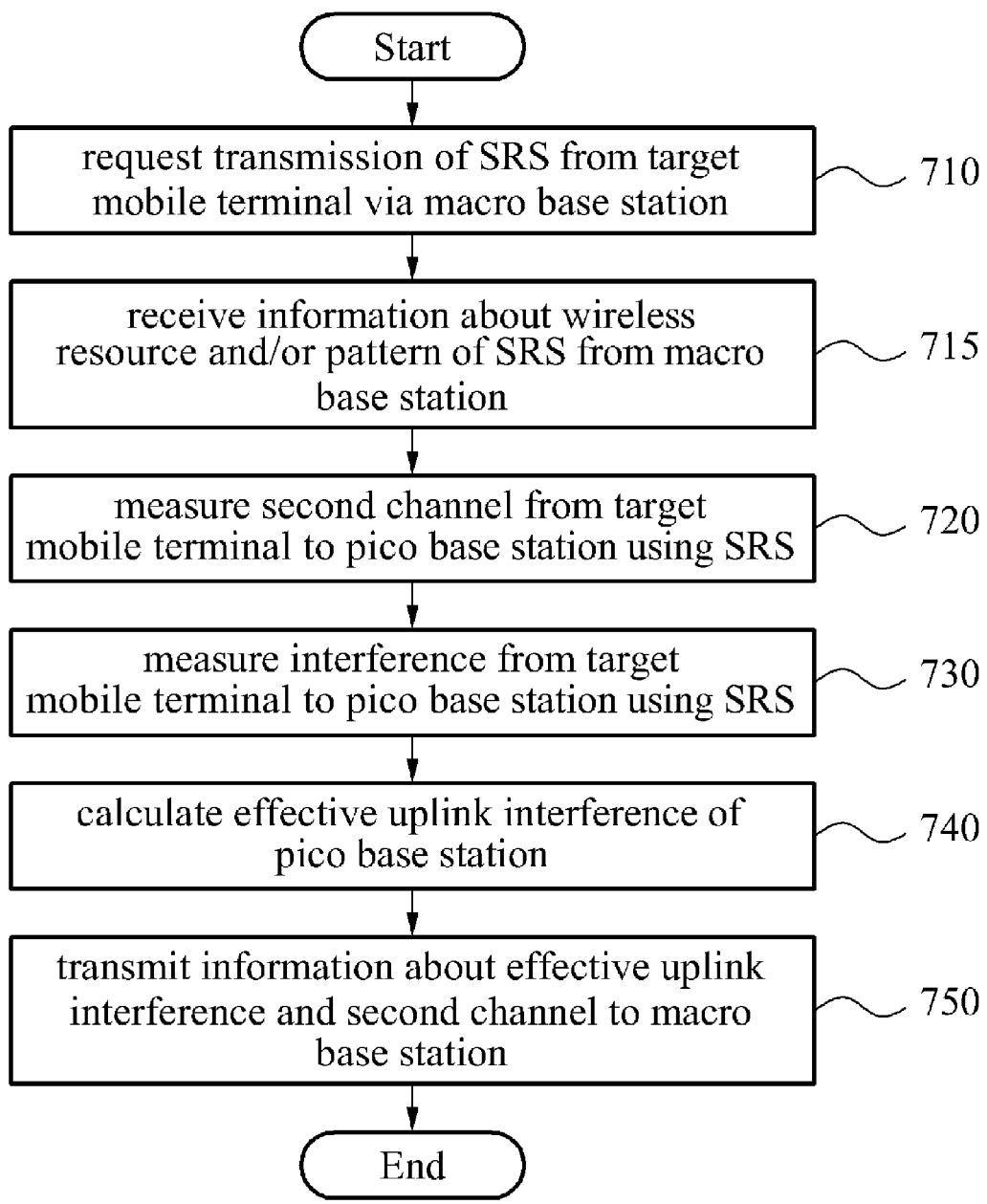
FIG. 7 is a flowchart illustrating an example of a communication method of a pico base station.

FIG. 7 is a flowchart illustrating an example of a communication method of a pico base station.

Referring to FIG. 7, the pico base station requests transmission of an SRS from a target mobile terminal via a macro base station (710).

The pico base station receives information about a wireless resource of the SRS and/or information about a pattern of the SRS from the macro base station (715).

The pico base station measures a second channel from the target mobile terminal to the pico base station using the SRS transmitted by the target mobile terminal (720).

The pico base station measures an interference from the target mobile terminal to the pico base station using the SRS transmitted by the target mobile terminal (730).

The pico base station calculates an effective uplink interference of the pico base station excluding an uplink interference from the target mobile terminal in a macrocell to the pico base station (740).

The pico base station transmits, to the macro base station serving the target mobile terminal in the macrocell, information about the effective uplink interference of the pico base station and information about the second channel from the target mobile terminal to the pico base station (750).

FIG. 8 is a flowchart illustrating an example of a communication method of a mobile terminal.

Referring to FIG. 8, the mobile terminal, which is currently connected to a macro base station, receives a request for transmission of an SRS from the macro base station (810).

The mobile terminal transmits the SRS to the macro base station and a pico base station of a picocell in a macrocell of the macro base station (830).

The mobile terminal transmits the SRS using information about the wireless resource of the SRS and/or information about the pattern of the SRS, which is determined in advance based on an ID of the target mobile terminal in a transmission resource of an uplink SRS allocated by the macro base station.

The mobile terminal determines whether the macro base station has determined to perform a handover of the target mobile terminal to the pico base station based on an uplink interference $I_1$ of the macro base station and an effective uplink interference $I_2$ of the pico base station (840).

The effective uplink interference $I_2$ of the pico base station is obtained by excluding an uplink interference $I_3$ from the target mobile terminal to the pico base station from a total uplink interference $I_2'=I_2+I_3$ of the pico base station.

The mobile terminal receives a handover instruction from the macro base station if the macro base station determines to perform the handover of the target mobile terminal to the pico base station based on the uplink interference $I_1$ of the macro base station and the effective uplink interference $I_2$ of the pico base station excluding the uplink interference $I_3$ from the target mobile terminal to the pico base station (850).

The mobile terminal performs a handover process to perform the handover to the pico base station in response to the receiving of the handover instruction (860).

If the macro base station determines not to perform the handover of the target mobile terminal to the pico base station based on the uplink interference $I_1$ of the macro base station and the effective uplink interference $I_2$ of the pico base station excluding the uplink interference $I_3$ from the target mobile terminal to the pico base station ("No" in the operation 840), the mobile terminal remains connected to the macro base station.

FIG. 9 is a flowchart illustrating an example of a method of determining whether to perform a handover of a mobile terminal by comparing total average uplink power consumptions before and after an assumed handover of the mobile terminal.

Referring to FIG. 9, in a heterogeneous network for uplink traffic according to the present example, whether to perform a handover of a mobile terminal to a macro base station or a pico base station is determined using an uplink power consumption of the mobile terminal corresponding to an uplink SINR used to determine a handover of the mobile terminal to the macro base station or the pico base station.

That is, since comparing uplink SINRs before and after an assumed handover of the mobile terminal and comparing uplink power consumptions of the mobile terminal corresponding to the uplink SINRs before and after the assumed handover of the mobile terminal produce the same result, the handover may be determined by comparing uplink power consumptions of the mobile terminal before and after the assumed handover.

In the present example, a result of resource allocation to the macro base station and the pico base station are used in a process of selecting a cell.

First, the macro base station and the pico base station respectively manage a result of resource allocation to the macro base station and the pico base station (910).

The resource allocation result may include an average throughput, or an average uplink power consumption, or an average allocated bandwidth, or an effective uplink interference, or the like, or any combination thereof.

In the present example, a mobile terminal in a macrocell is being provided with a service in the macrocell by the macro base station and is operating when the mobile terminal enters a picocell in the macrocell. Thus, the macro base station and the pico base station determine whether the mobile terminal in the macrocell enters the picocell (920).

The macro base station identifies an average uplink power consumption of the mobile terminal when the mobile terminal in the macrocell is provided with a service in the macrocell, and the pico base station identifies an average uplink power consumption when the mobile terminal in the picocell is provided with a service in the picocell (930).

The macro base station and the pico base station assume that the mobile terminal in the macrocell is handed over to the picocell (940).

The macro base station calculates an average uplink power consumption when the mobile terminal in the macrocell handed over to the picocell is provided with a service in the picocell, and the pico base station calculates an average uplink power consumption when the mobile terminal in the picocell is provided with a service in the picocell after the mobile terminal in the macrocell is handed over to the picocell (950).

The macro base station compares the total average uplink power consumption of the mobile terminal in the macrocell and the mobile terminal in the picocell before the assumed handover of the mobile terminal in the macrocell to the picocell with the total average uplink power consumption of the mobile terminal in the macrocell and the mobile terminal in the picocell after the assumed handover of the mobile terminal in the macrocell to the picocell (960).

The macro base station determines whether the mobile terminal in the macrocell is to continue to be provided with a service in the macrocell, or is to be handed over to the picocell, based on a result of the comparing of the total average uplink power consumption before and after the assumed handover of the mobile terminal in the macrocell to the picocell (970).

That is, the macro base station calculates a total average uplink power consumption of the mobile terminal in the macrocell and the mobile terminal in the picocell before and after the assumed handover of the mobile terminal in the macrocell to the picocell, and determines whether the mobile terminal in the macrocell is to be handed over to the picocell.

FIG. 10 illustrates an example of an operation of a network to determine whether to perform a handover of a mobile terminal using the method shown in FIG. 9.

Referring to FIG. 10, the network to determine whether to perform the handover based on an uplink power consumption of a mobile terminal in the heterogeneous network for uplink traffic includes a mobile terminal 1001 in a picocell, a pico base station 1003 serving the mobile terminal 1001, a macro base station 1005, and a mobile terminal 1007 in a macrocell served by the macro base station 1005 to be handed over to the picocell.

The mobile terminal 1007 in the macrocell is a target mobile terminal to be handed over from the macrocell to the picocell.

The pico base station 1003 manages a result of a resource allocation to the mobile terminal 1001 in the picocell (1010), and the macro base station 1005 manages a result of a resource allocation to the mobile terminal 1007 in the picocell (1010).

In the present example, the resource allocation result of each cell is used in a cell selection process. A time averaging process is needed to convert a resource allocation result in a short-term time scale to a resource allocation result in a long-term time scale in which a cell is selected.

Generally, the short-term time scale may be units of several frames, and the long-term time scale may be units of several seconds, which enable a handover of the mobile terminal to be observed.

First, a process of allocating an uplink resource will be described.

The process of allocating the uplink resource is a series of processes of properly distributing available sub-channels in respective base stations to respective users and properly allocating power based on an SINR and a throughput, which are expressed by the following equations.

The SINR for user i in cell j for sub-channel k is expressed by the following Equation 3:

$$\Gamma_{i,j}^{[k]} = \frac{h_{i,j}^{[k]} p_{i,j}^{[k]}}{N_0 \frac{B}{N_S} + \sum_{v \neq j} \sum_{u \in U_V} h_{u,j}^{[k]} p_{u,v}^{[k]}} \quad (3)$$

The instantaneous throughput for user i in cell j for sub-channel k is expressed by the following Equation 4:

$$r_{i,j}^{[k]} = \frac{B}{N_S} \log_2\left(1 + \Gamma_{i,j}^{[k]}\right) \quad (4)$$

The instantaneous throughput for user i in cell j is expressed by the following Equation 5:

$$r_{i,j} = \sum_{k=1}^{N_S} r_{i,j}^{[k]} x_{i,j}^{[k]} \quad (5)$$

The meanings of the symbols and the indices in the above equations and the following equations are explained in Table 1 below.

TABLE 1

| Notation | Meaning | Notation | Meaning |
|---|---|---|---|
| i and u | User index | h | Instantaneous channel gain |
| j and v | Base station index | g | Average channel gain |
| k | Subcarrier index | B | Total bandwidth |
| m | Time index | $N_s$ | Total number of subcarriers |
| p | Power | Uj | Set of users in base station j |
| r | Rate (throughput) | x | Subcarrier assignment variable (binary) |
| w | Allocated bandwidth | M | Time averaging window |
| Z | Effective interference | H (u, v) | Handoff event (user u in base station v) |
| I | Inter-cell interference | Γ | Target SINR |
| $N_0$ | Noise density | | |

The resource allocation result includes an instantaneous throughput r, an instantaneous power p, and an instantaneous allocated bandwidth w.

In order to convert the resource allocation result in the short-term time scale to a resource allocation result in the long-term time scale in which a cell is selected, in the present example, a time averaging process is used to calculate an average throughput, an average uplink power consumption, and an average allocated bandwidth.

The average throughput is expressed by the following Equation 6:

$$\tilde{r}_{i,j} = \sum_{m=m_0}^{m_0+M-1} r_{i,j}(m) = \sum_{m=m_0}^{m_0+M-1} \sum_{k=1}^{N_S} r_{i,j}^{[k]}(m) \cdot x_{i,j}^{[k]}(m) \quad (6)$$

The average uplink power consumption is expressed by the following Equation 7:

$$\tilde{p}_{i,j} = \sum_{m=m_0}^{m_0+M-1} \sum_{k=1}^{N_S} p_{i,j}^{[k]}(m) \cdot x_{i,j}^{[k]}(m) \quad (7)$$

The average allocated bandwidth is expressed by the following Equation 8:

$$\tilde{w}_{i,j} = \sum_{m=m_0}^{m_0+M-1} \sum_{k=1}^{N_S} \frac{B}{N_S} \cdot x_{i,j}^{[k]}(m) \quad (8)$$

Once the average throughput, the average uplink power consumption, and the average allocated bandwidth of a mobile terminal have been calculated using the above equations, an interference in an uplink of the mobile terminal in a predetermined period of time may be calculated using these results and Shannon's Equation.

The above interference is defined as an effective uplink interference Zi,j of the mobile terminal, which is indirectly expressed by the following Equation 9:

$$\tilde{r}_{i,j} = \tilde{w}_{i,j} \log_2\left(1 + \frac{g_{i,j} \tilde{p}_{i,j}}{Z_{i,j}}\right) = \tilde{w}_{i,j} \log_2\left(1 + \frac{g_{i,j} \tilde{p}_{i,j}}{N_0 \tilde{w}_{i,j} + \tilde{I}_{i,j}}\right) \quad (9)$$

Thus, the average throughput, the average uplink power consumption, and the average allocated bandwidth are obtained by converting the resource allocation result in the short-time scale into an resource allocation result in the long-term time scale using the time averaging process.

Also, the effective uplink interference is calculated using Shannon's Equation and the average throughput, the average uplink power consumption, and the average allocation bandwidth, so that an interference in the mobile terminal in a predetermined period of time may be identified.

The mobile terminal 1007 in the macrocell to be handed over to the picocell transmits information about an average uplink power consumption of the mobile terminal 1007 in the macrocell to the macro base station 1005 (1015), and the mobile terminal 1001 in the picocell transmits information about an average uplink power consumption of the mobile terminal 1001 in the picocell to the pico base station 1003 (1015).

The mobile terminal 1007 in the macrocell to be handed over to the picocell receives a downlink (DL) preamble signal from the pico base station 1003 (1020).

The mobile terminal 1007 in the macrocell to be handed over to the picocell determines whether a signal strength of the downlink preamble signal received from the pico base station 1003 is greater than or equal to a predetermined threshold (1025).

When the signal strength of the downlink preamble signal is greater than or equal to the predetermined threshold, the mobile terminal 1007 in the macrocell to be handed over to the picocell, the macro base station 1005, and the pico base station 1003 perform a negotiation for transmitting an uplink (UL) reference signal through an uplink channel sounding process (1030).

The mobile terminal 1007 in the macrocell to be handed over to the picocell transmits the uplink reference signal to the pico base station 1003 based on a result of the negotiation (1035).

The pico base station 1003 receives the uplink reference signal and measures an uplink channel gain of an uplink channel between the mobile terminal 1007 in the macrocell to be handed over to the picocell and the pico base station 1003 (1040).

The pico base station 1003 calculates an average uplink power consumption of the mobile terminal 1001 in the picocell after the assumed handover of the mobile terminal 1007 in the macrocell to the picocell using the uplink channel gain (1045).

In the present example, the average throughput, the average uplink power consumption, the average allocation bandwidth, and the effective uplink interference, which are calculated as described above, are used to determine whether the mobile terminal 1007 in the macrocell entering the picocell is to continue to be provided with a service from the macrocell, or is to be handed over to the picocell to be provided with a service from the picocell.

An average uplink power consumption of the mobile terminal 1001 already connected to the picocell after the mobile terminal 1007 in the macrocell is handed over to the picocell will be described below.

After the mobile terminal 1007 in the macrocell is handed over to the picocell, an uplink inter-cell interference of the mobile terminal 1001 in the picocell already connected to the picocell will decrease by an amount of an uplink inter-cell interference generated in the mobile terminal 1001 already connected to the picocell by the mobile terminal 1007 in the macrocell before the mobile terminal 1007 in the macrocell was handed over to the picocell. This decrease in the uplink inter-cell interference in the mobile terminal 1001 already connected to the picocell is expressed by the following Equation 10:

$$Z_{i,j}^{H(u,v)} = N_0 \tilde{w}_{i,j} + \tilde{I}_{i,j} - g_{u,j}\tilde{p}_{u,v} \tag{10}$$

The mobile terminal 1001 already connected to the picocell may be assumed to have the same throughput using the same bandwidth after the assumed handover of the mobile terminal 1007 in the macrocell to the picocell that it had before the assumed handover of the mobile terminal 1007 in the macrocell to the picocell.

Then, using Shannon's Equation, the average uplink power consumption of the mobile terminal 1001 already connected to the picocell after the mobile terminal 1007 in the macrocell is handed over to the picocell can be derived as follows.

Shannon's Equation for the mobile terminal 1001 already connected to the picocell after the mobile terminal 1007 in the macrocell is handed over to picocell is expressed by the following Equation 11:

$$\tilde{r}_{i,j}^{H(u,v)} = \tilde{w}_{i,j} \log_2\left(1 + \frac{g_{i,j}\tilde{p}_{i,j}^{H(u,v)}}{Z_{i,j}^{H(u,v)}}\right) \tag{11}$$

The average uplink power consumption of the mobile terminal 1001 already connected to the picocell after the mobile terminal 1007 in the macrocell is handed over to picocell is expressed by the following Equation 12:

$$\tilde{p}_{i,j}^{H(u,v)} = \frac{Z_{i,j}^{H(u,v)}}{g_{i,j}} \exp\left\{\ln 2 \cdot \left(\frac{\tilde{r}_{i,j}}{\tilde{w}_{i,j}}\right) - 1\right\} \tag{12}$$

The pico base station 1003 transmits, to the macro base station 1005, information about the uplink channel gain of the uplink channel between the pico base station 1003 and the mobile terminal 1007 in the macrocell measured by the pico base station 1003 in the operation 1040, the information about the average uplink power consumption of the mobile terminal 1001 already connected to the picocell before the assumed handover of the mobile terminal 1007 in the macrocell to the picocell that the pico base station 1003 received from the mobile terminal 1001 already connected to the picocell in the operation 1015, and information about the uplink power consumption of the mobile terminal 1001 already connected to the picocell after the assumed handover of the mobile terminal 1007 in the macrocell to the picocell that the pico base station 1003 calculated in the operation 1045 (1050).

The macro base station 1005 receives, from the pico base station 1003, the information about the uplink channel gain, the information about the average uplink power consumption of the mobile terminal 1001 already connected to the picocell before and after the assumed handover of the mobile terminal 1007 in the macrocell to the picocell, and calculates an average uplink power consumption of the mobile terminal 1007 in the macrocell after the assumed handover of the mobile terminal 1007 in the macrocell to the picocell (1055).

An average uplink power consumption of the mobile terminal 1007 in the macrocell after the mobile terminal 1007 in the macrocell is handed over to the picocell will be described below.

An effective uplink interference in the mobile terminal 1007 in the macrocell after the mobile terminal 1007 in the macrocell is handed over to the picocell may be assumed to be an average effective uplink interference induced in the mobile terminal 1007 in the macrocell by mobile terminals already connected to the picocell.

A picocell generally provides a communication service in a small area such as a hotspot area. Thus, a distribution of mobile terminals outside the picocell causing inter-cell interference in mobile terminals in the picocell is assumed to be substantially the same for all of the mobile terminals in the picocell.

Therefore, the effective uplink interference in the mobile terminal 1007 in the macrocell after the mobile terminal 1007 in the macrocell is handed over to the picocell is expressed by the following Equation 13:

$$Z_{u,j}^{H(u,v)} = \frac{1}{|U_j|} \sum_{i \in U_j} Z_{i,j}^{H(u,v)} \tag{13}$$

The mobile terminal 1007 in the macrocell may be assumed to have the same throughput using the same bandwidth after the mobile terminal 1007 in the macrocell is handed over to the picocell as before the mobile terminal 1007 in the macrocell is handed over to the picocell.

The average uplink power consumption of the mobile terminal 1007 in the macrocell after the mobile terminal 1007 in the macrocell is handed over to the picocell can be derived as follows.

Shannon's Equation for the mobile terminal 1007 in the macrocell receiving service from the macrocell before being handed over to the picocell is expressed by the following Equation 14:

$$\tilde{r}_{u,v} = \tilde{w}_{u,v} \log_2\left(1 + \frac{g_{u,v}\tilde{p}_{u,v}}{Z_{u,v}}\right) \quad (14)$$

Shannon's Equation for the mobile terminal 1007 in the macrocell receiving service from the picocell after being handed over to the picocell is expressed by the following Equation 15:

$$\tilde{r}_{u,j}^{H(u,v)} = \tilde{w}_{u,j}^{H(u,v)} \log_2\left(1 + \frac{g_{u,j}\tilde{p}_{u,j}^{H(u,v)}}{Z_{u,j}^{H(u,v)}}\right) \quad (15)$$

The average uplink power consumption of the mobile terminal 1007 in the macrocell receiving service from the picocell after being handed over to the picocell is expressed by the following Equation 16:

$$\tilde{p}_{u,j}^{H(u,v)} = \frac{Z_{u,j}^{H(u,v)}}{g_{u,j}} \exp\left\{\ln 2 \cdot \left(\frac{\tilde{r}_{u,j}^{H(u,v)}}{\tilde{w}_{u,j}^{H(u,v)}}\right) - 1\right\}$$

$$= \frac{\sum_{i \in U_j} Z_{i,j}^{H(u,v)}}{|U_j|} \cdot \frac{1}{g_{u,j}} \exp\left\{\ln 2 \cdot \left(\frac{\tilde{r}_{u,v}}{\tilde{w}_{u,v}}\right) - 1\right\} \quad (16)$$

The macro base station 1005 selects the macro base station 1005 or the pico base station 1003 to provide service to the mobile terminal 1007 in the macrocell based on a total average uplink power consumption of the mobile terminal 1007 in the macrocell and the mobile terminal 1001 already connected to the picocell, and accordingly determines a handover using the total average uplink power consumption of the mobile terminal 1007 in the macrocell and the mobile terminal 1001 already connected to the picocell.

When the mobile terminal 1007 in the macrocell is assumed to be handed over to the picocell, the average uplink power consumption of the mobile terminal 1007 in the macrocell after the assumed handover may be calculated in the operation 1055 as described above, and the average uplink power consumption of the mobile terminal 1001 already connected to the picocell after the assumed handover may be calculated in the operation 1045 as described above. As described above, the average uplink power consumption of the mobile terminal 1007 in the macrocell before the mobile terminal 1007 in the macrocell is assumed to be handed over to the picocell and the average uplink power consumption of the mobile terminal 1001 already connected to the picocell before the mobile terminal 1007 in the macrocell is assumed to be handed over to the picocell were identified in the operation 1015.

In the present example, the average uplink power consumptions of the mobile terminal 1007 in the macrocell and the mobile terminal 1001 already connected to the picocell before and after the assumed handover of the mobile terminal 1007 in the macrocell to the picocell are used to select the macro base station 1005 or the pico base station 1003 to provide service to the mobile terminal 1007 in the macrocell, that is, to select whether the mobile terminal 1007 in the macrocell is to continue to be provided with a service from the macrocell, or whether the mobile terminal 1007 in the macrocell is to be handed over to the picocell to be provided with a service from the picocell.

That is, in the present example, a handover is determined (i.e., the macro base station 1005 or the pico base station 1003 is selected to provide service to the mobile terminal 1007 in the macrocell) based on a comparison of a sum of the average uplink power consumption of the mobile terminal 1007 in the macrocell and the average uplink power consumption of the mobile terminal 1001 already connected to the picocell before the mobile terminal 1007 in the macrocell is assumed to be handed over to the picocell with a sum of the average uplink power consumption of the mobile terminal 1007 in the macrocell and the average uplink power consumption of the mobile terminal 1001 already connected to the picocell after the mobile terminal 1007 in the macrocell is assumed to be handed over to the picocell (1060).

More specifically, when a total average uplink power consumption of the mobile terminal 1007 in the macrocell and the mobile terminal 1001 already connected to the picocell before the mobile terminal 1007 in the macrocell is assumed to be handed over to the picocell is less than a total average uplink power consumption of the mobile terminal 1007 in the macrocell and the mobile terminal 1001 already connected to the picocell after the mobile terminal 1007 in the macrocell is assumed to be handed over to the picocell, the mobile terminal 1007 in the macrocell is not handed over to the picocell but continues to be provided with a service from the macrocell.

On the contrary, when the total average uplink power consumption of the mobile terminal 1007 in the macrocell and the mobile terminal 1001 already connected to the picocell before the mobile terminal 1007 in the macrocell is assumed to be handed over to the picocell is greater than the total average uplink power consumption of the mobile terminal 1007 in the macrocell and the mobile terminal 1001 already connected to the picocell after the mobile terminal 1007 in the macrocell is assumed to be handed over to the picocell, the mobile terminal 1007 in the macrocell is handed over to the picocell and is provided with a service from the picocell.

The cell selection method described above with respect to FIGS. 9 and 10 uses an uplink channel sounding process to measure an uplink channel gain between the mobile terminal 1007 in the macrocell entering the picocell and the pico base station 1003.

In order to eliminate the overhead caused by the uplink channel sounding process, that is, to eliminate the negotiation by the mobile terminal 1007, the macro base station 1005, and the pico base station 1003 for the transmitting of the uplink reference signal in the operation 1030 in FIG. 10, and the transmitting of the uplink reference signal by the mobile terminal 1007 in the macrocell in the operation 1035 in FIG. 10, a result of resource allocation to each of the pico base station 1003 and the macro base station 1005 may be used to simply select a cell instead of performing the entire process described above. This procedure will be described below.

As described above, the pico base station 1003 and the macro base station 1005 change resource allocation results in the short-term time scale to an average throughput, an average uplink power consumption, an average allocated bandwidth, and an effective uplink interference in the long-term time scale with respect to the mobile terminal 1001 in the picocell and the mobile terminal 1007 in the macrocell through a time averaging process.

Further, the pico base station 1003 calculates an average effective uplink interference of all mobile terminals connected to the pico base station 1003, and the macro base station 1005 calculates an average effective uplink interference of all mobile terminals connected to the macro base station 1005. The average effective uplink interference of all mobile terminals connected to a base station is defined to be a cell-specific effective interference of the base station.

The effective uplink interference $Z_{i,j}$ of each mobile terminal is indirectly expressed by the following Equation 17:

$$\tilde{r}_{i,j} = \tilde{w}_{i,j}\log_2\left(1 + \frac{g_{i,j}\tilde{p}_{i,j}}{Z_{i,j}}\right) = \tilde{w}_{i,j}\log_2\left(1 + \frac{g_{i,j}\tilde{p}_{i,j}}{N_0\tilde{w}_{i,j} + \tilde{I}_{i,j}}\right) \quad (17)$$

The cell-specific effective interference $Z_j$ of each base station is expressed by the following Equation 18:

$$Z_j = \frac{1}{|U_j|}\sum_{i \in U_j} Z_{i,j} \quad (18)$$

The pico base station 1003 and the macro base station 1005 transmit their cell-specific effective interferences to the mobile terminal 1007 in the macrocell to be handed over to the picocell.

Using Equation 19 below, the mobile terminal 1007 calculates an effective SINR for the pico base station 1003 based on the cell-specific effective interference of the pico base station 1003 and a downlink channel gain of a downlink channel between the pico base station 1003 and the mobile terminal 1007 measured using a downlink preamble signal transmitted from the pico base station 1003 to the mobile terminal 1007, and also calculates an effective SINR for the macro base station 1005 based on the cell-specific effective interference of the macro base station 1005 and a downlink channel gain of a downlink channel between the macro base station 1005 and the mobile terminal 1007 measured using a downlink preamble signal transmitted from the macro base station 1005 to the mobile terminal 1007.

The effective SINR between user i and cell j is expressed by the following Equation 19:

$$SINR_{i,j} = \frac{g_{i,j}}{Z_j} \quad (19)$$

Finally, the mobile terminal 1007 selects whichever one of the pico base station 1003 and the macro base station 1005 has the highest effective SINR.

The processes, functions, methods, and/or software described above with respect to communication methods of a mobile terminal, a pico base station, and a macro base station in a heterogeneous network may be recorded, stored, or fixed in one or more non-transitory computer-readable storage medium that includes program instructions to be implemented by a computer to cause a processor to execute or perform the program instructions. The non-transitory computer-readable storage medium may also include, alone or in combination with the program instructions, data files, data structures, and the like. The non-transitory computer-readable storage medium and program instructions may be specially designed and constructed, or may be of the kind well-known and available to those having skill in the computer software art. Examples of a non-transitory computer-readable medium include magnetic media such as hard disks, floppy disks, and magnetic tape; optical media such as CD-ROMs and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the claims and their equivalents.

What is claimed is:

1. A communication method of a macro base station serving a target mobile terminal in a macrocell, the macrocell comprising a picocell, the communication method comprising:
    receiving information about a pico base station from the target mobile terminal;
    requesting information about an uplink interference of the pico base station;
    receiving information about the uplink interference of the pico base station in the picocell from the pico base station; and
    determining whether to perform a handover of the target mobile terminal to the pico base station based on an uplink interference of the macro base station and an uplink interference of the pico base station.

2. The communication method of claim 1, wherein the determining of whether to perform the handover comprises:
    calculating a signal-to-interference plus noise ratio (SINR) of the macro base station in an uplink;
    calculating an SINR of the pico base station in an uplink; and
    determining whether to perform the handover of the target mobile terminal to the pico base station based on the SINR of the macro base station and the SINR of the pico base station.

3. The communication method of claim 1, wherein the determining of whether to perform the handover comprises determining whether to perform the handover of the target mobile terminal to the pico base station by comparing a signal-to-interference plus noise ratio (SINR) of the macro base station with an SINR of the pico base station.

4. The communication method of claim 1, wherein the determining of whether to perform the handover comprises determining to perform the handover of the target mobile terminal to whichever one of the macro base station and the pico base station has a higher signal-to-interference plus noise ratio (SINR).

5. The communication method of claim 1, further comprising receiving, before receiving the information about the uplink interference of the pico base station:
   information about a first channel between the macro base station and the target mobile terminal;
   information about a second channel between the target mobile terminal and the pico base station;
   information about the pico base station.

6. The communication method of claim 1, further comprising transmitting a handover instruction to the target mobile terminal when a result of the determining is to perform the handover of the target mobile terminal to the pico base station.

7. A non-transitory computer-readable medium comprising a program for instructing a computer to perform the communication method of claim 1.

8. A communication method of a pico base station in a macrocell, the communication method comprising:
   transmitting information about the pico base station to a target mobile terminal to enable the target mobile terminal to transmit the information about the pico base station to a macro base station;
   receiving a request for information about an uplink interference of the pico base station from the macro base station serving the target mobile terminal in the macrocell;
   transmitting the information about the uplink interference of the pico base station to the macro base station; and
   performing a handover process to perform a handover of the target mobile terminal to the pico base station when the macro base station determines that the handover of the target mobile terminal to the pico base station is to be performed based on the information about the uplink interference of the pico base station.

9. A communication method of a macro base station serving a target mobile terminal in a macrocell, the macrocell comprising a picocell, the communication method comprising:
   receiving, from a pico base station, a request for the target mobile terminal to transmit a sounding reference signal;
   requesting the target mobile terminal to transmit the sounding reference signal to the target mobile terminal and the pico base station to enable the macro base station to measure a first channel from the target mobile terminal to the macro base station, and the pico base station to measure a second channel from the target mobile terminal to the pico base station;
   receiving, from the pico base station of the picocell, information about an effective uplink interference of the pico base station excluding an uplink interference from the target mobile terminal to the pico base station; and
   determining whether to perform a handover of the target mobile terminal to the pico base station based on an uplink interference of the macro base station and the effective uplink interference of the pico base station.

10. The communication method of claim 9, further comprising receiving, from the pico base station, information about the second channel from the target mobile terminal to the pico base station.

11. The communication method of claim 9, further comprising sharing information about a wireless resource of the sounding reference signal and/or information about a pattern of the sounding reference signal with the pico base station.

12. The communication method of claim 9, wherein the determining of whether to perform the handover comprises:
   calculating a signal-to-interference plus noise ratio (SINR) of the macro base station in an uplink based on the uplink interference of the macro base station;
   calculating an effective SINR of the pico base station in an uplink based on the effective uplink interference of the pico base station; and
   determining whether to perform the handover of the target mobile terminal to the pico base station based on the SINR of the macro base station and the effective SINR of the pico base station.

13. A communication method of a pico base station in a macrocell, the communication method comprising:
   transmitting, to a macro base station, a request for a target mobile terminal to transmit a sounding reference signal;
   measuring the channel from the target mobile terminal to the pico base station using the sounding reference signal;
   calculating an effective uplink interference of the pico base station excluding an uplink interference from the target mobile terminal in the macrocell to the pico base station; and
   transmitting, to the macro base station serving the target mobile terminal in the macrocell, information about the effective uplink interference of the pico base station, and information about a channel from the target mobile terminal to the pico base station.

14. The communication method of claim 13, further comprising measuring the uplink interference from the target mobile terminal to the pico base station using the sounding reference signal.

15. A communication method of a target mobile terminal in a macrocell served by a macro base station, the macrocell comprising a picocell, the communication method comprising:
   receiving, from the macro base station, a request for the target mobile terminal to transmit a sounding reference signal;
   transmitting the sounding reference signal to the macro base station and a pico base station of the picocell; and
   receiving a handover instruction from the macro base station when the macro base station determines to perform a handover of the target mobile terminal to the pico base station based on an uplink interference of the macro base station and an effective uplink interference of the pico base station excluding an uplink interference from the target mobile terminal to the pico base station.

16. The communication method of claim 15, wherein the transmitting of the sounding reference signal comprises transmitting the sounding reference signal using information about a wireless resource of the sounding reference signal and/or information about a pattern of the sounding reference signal that is determined in advance.

17. The communication method of claim 15, further comprising performing a handover process to perform the handover of the target mobile terminal to the pico base station in response to the receiving of the handover instruction.

18. A communication method of a macro base station serving a mobile terminal in a macrocell, the macrocell comprising a picocell of a pico base station serving a mobile terminal in the picocell, the communication method comprising:
   receiving, from the mobile terminal in the macrocell, an average uplink power consumption of the mobile terminal in the macrocell before an assumed handover of the mobile terminal in the macrocell to the picocell;

receiving, from the pico base station, an uplink channel gain of an uplink channel between the mobile terminal in the macrocell and the pico base station, an average uplink power consumption of the mobile terminal in the picocell before the assumed handover of the mobile terminal in the macrocell to the picocell, and an average uplink power consumption of the mobile terminal in the picocell after the assumed handover of the mobile terminal in the macrocell to the picocell;

calculating an average uplink power consumption of the mobile terminal in the macrocell after the assumed handover of the mobile terminal in the macrocell to the picocell based on the uplink channel gain of the uplink channel between the mobile terminal in the macrocell and the pico base station;

comparing a sum of the average uplink power consumption of the mobile terminal in the macrocell and the average uplink power consumption of the mobile station in the picocell before the assumed handover of the mobile station in the macrocell to the picocell with a sum of the average uplink power consumption of the mobile terminal in the macrocell and the average uplink power consumption of the mobile station in the picocell after the assumed handover of the mobile station in the macrocell to the picocell; and determining whether to hand over the mobile terminal in the macrocell to the picocell based on a result of the comparing.

19. The communication method of claim 18, wherein the determining comprises:

determining to hand over the mobile terminal in the macrocell to the picocell if the sum of the average uplink power consumption of the mobile terminal in the macrocell and the average uplink power consumption of the mobile station in the picocell before the assumed handover of the mobile station in the macrocell to the picocell is greater than the sum of the average uplink power consumption of the mobile terminal in the macrocell and the average uplink power consumption of the mobile station in the picocell after the assumed handover of the mobile station in the macrocell to the picocell; and determining not to hand over the mobile terminal in the macrocell to the picocell if the sum of the average uplink power consumption of the mobile terminal in the macrocell and the average uplink power consumption of the mobile station in the picocell before the assumed handover of the mobile station in the macrocell to the picocell is less than the sum of the average uplink power consumption of the mobile terminal in the macrocell and the average uplink power consumption of the mobile station in the picocell after the assumed handover of the mobile station in the macrocell to the picocell.

* * * * *